J. BONE.
Grain Winnower.
No. 11,116. Patented June 20, 1854.
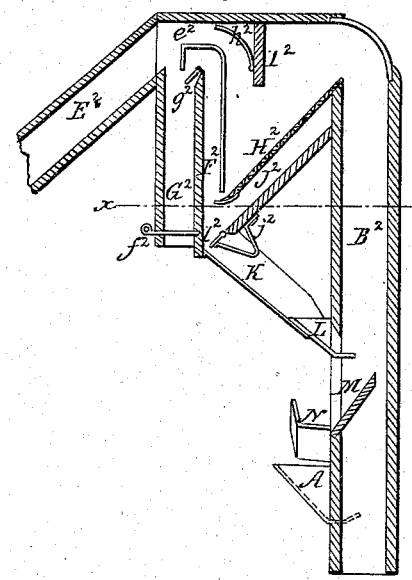
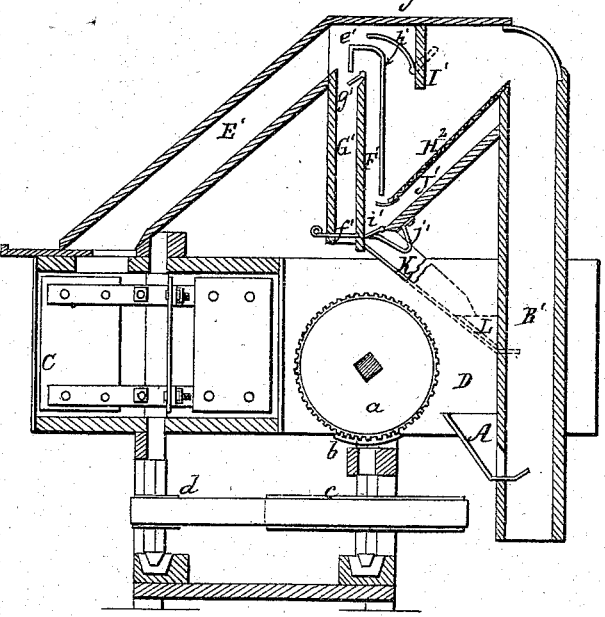
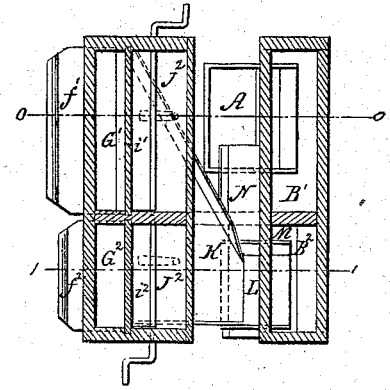
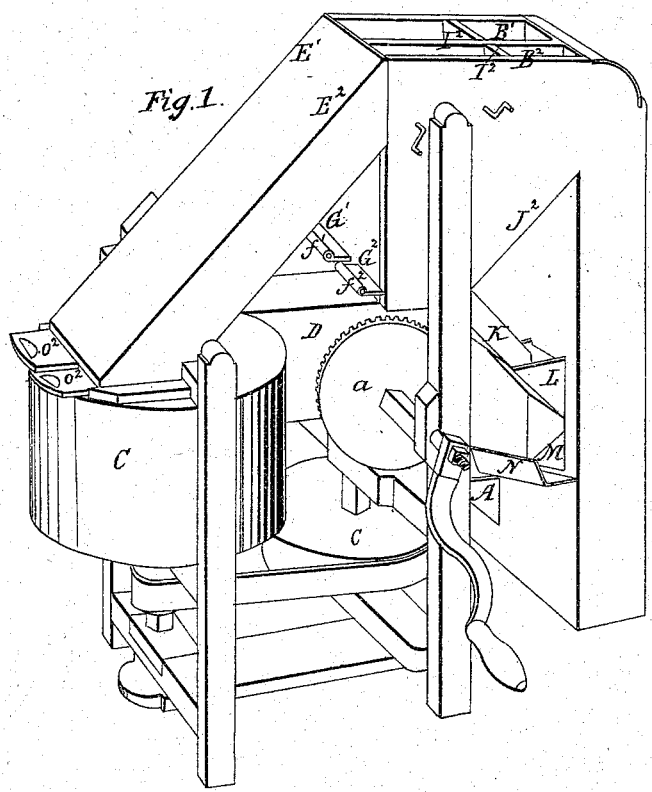

UNITED STATES PATENT OFFICE.

JOSEPH BONE, OF WARRENTON, OHIO.

GRAIN-WINNOWER.

Specification of Letters Patent No. 11,116, dated June 20, 1854.

*To all whom it may concern:*

Be it known that I, JOSEPH BONE, of Warrenton, in the county of Jefferson and State of Ohio, have invented certain new and useful Improvements in Grain-Separators; and I do hereby declare that the following is a full, clear, and exact description of the same, reference being had to the accompanying drawings, forming part of this specification, in which—

Figure 1 is a perspective view of the machine, the top being represented open. Fig. 2 is a vertical longitudinal section taken as indicated by the line $o$ $o$ Fig. 4. Fig. 3 is a similar section viewed as denoted by the line 1 1 Fig. 4, showing only the second course of tubes and omitting the parts represented in Fig. 2. Fig. 4 is a sectional plan in part taken as indicated by the line $x$ $x$ Fig. 3, omitting the fan and other appurtenances.

The same letters of reference denote corresponding parts throughout the several figures.

My invention relates to a machine for cleansing or depriving threshed grain of its impurities and separating the several grades of grain according to their specific gravity; the nature of it consists in the combination and arrangement of two or more sets of tubes or spouts so connected with each other that the grain may be continually passed through the entire series at the will of the operator, and by the action of a suction fan and a proper graduation of the tubes be entirely cleansed and separated as desired, the construction and arrangement being such as will be hereafter fully set forth.

To enable others skilled in the art to make and use my invention, I will proceed to describe the construction and operation of the several parts.

The uncleaned grain is fed to the machine by the hopper A which communicates with a vertical tube or spout $B^1$ closed at the top but open at the bottom.

C is an ordinary fan for producing the necessary suction or current in the machine, it discharging the air (which is drawn through the several grain tubes or passages) by the outlet branch D; the fan is operated through bevel wheels $a$ $b$ driven by any suitable power, and, through the pulley $c$, by belt, communicating to the fan-shaft-pulley $d$ the requisite velocity; or the fan, which is here represented as having its vanes vertical, may be otherwise suitably operated, or, any appropriate form of blower employed.

$E^1$, is an air or suction, pipe running in an inclined direction from the horizontal position and connected at its lower end with the fan or blower, but, at its upper end, with the air tubes through which the grain passes, of which tubes, $F^1$, is one, situated vertically, and having the current directed upward through it, it receiving the air at its bottom, as will appear from further description, and the current discharging at its top from under a dipping bonnet $e^1$, which is situated but little higher than the top end edge of the lower surface or bottom, of the suction pipe $E^1$, between which and the vertical tube $F^1$, is a chamber or receiver $G^1$, provided at its bottom with a horizontal slide $f^1$.

$g^1$, is a leaf valve, worked by handle Z from the outside of the machine; it, extending the width of the tube $F^1$, has a swivel movement, and, by its situation in the mouth of the dipping bonnet $e^1$, serves to regulate the current up through the tube $F^1$.

$H^1$ is an inclined perforated apron so placed as that its lower edge (where there projects a narrow horizontal ledge) leaves an opening or communication to the lower mouth (which is not closed by the projecting horizontal ledge of the screen) of the tube $F^1$—the screen or inclined apron inclining upward toward the one side or back of the tube $B^1$, which it meets, or is joined to, and, at the junction, forms a bridge, there being an open space or passage between it and the top of the machine forming the cover to the tube $B^1$.

$I^1$ is a partition projecting downward from the top of the machine, for a short distance between the tubes $B^1$, and $F^1$, of the same width as which, it is.

$h^1$ is a leaf valve working from one side of the partition $I^1$, it moving as indicated by arrow, being operated through handle from the outside and serving to regulate the supply of air to the tube $F^1$.

$J^1$ is a board inclining in the same direction as the screen or apron $H^1$, under which (leaving a space between) it is placed, extending from the back of the tube $B^1$ to within a short distance of the receiver $G^1$ near its bottom where it is interrupted from meeting by a leaf valve $i^1$ operating similarly to the valves already described but acted upon (to close it) by a spring $j^1$.

In continuation of the description, and to avoid unnecessary prolixity, it is here to be observed (as will be seen by reference to the drawings) that the several parts now about to be specified are simply repetitions of parts already referred to by the same letter but distinguished by the accompanying No. 1. Id est—the parts $B^2$, $E^2$, $F^2$, $e^2$, $G^2$, $f^2$, $g^2$, $H^2$, $I^2$, $h^2$, $J^2$, $i^2$, $j^2$. These latter parts are constructed and arranged similar to their duplicates described at the side of which (separated only by partitions) they stand, performing like offices as will be explained in the after operation, the only material difference (and that not an essential one) being in their dimensions which occurs, as is shown in the drawings, in the width of the tubes with their accompanying parts and length of the valves. But there are other devices connecting the operation of these duplicates, yet to be referred to. These are, the spout K which conveys the lighter grain through the spring valves $i^1$, $i^2$ to the hopper L discharging into the tube $B^2$; the hinged valve M in the tube $B^2$ which valve, if shut, would close an opening of the same area in the back of the tube, and the spout N conveying the grain, issuing through the latter named opening, to the original feed hopper A.

$O^1$ $O^2$ are horizontal slide gates covering the apertures connecting the fan with the suction pipes $E^1$ $E^2$ and serving to regulate the general current.

The operation and further description is as follows: The uncleaned but threshed grain being thrown into the hopper A, the fan set in motion, and the several valves and slides regulating the current properly adjusted, the heaviest grades of grain descend into a suitable receptacle at the bottom of the tube $B^1$ while the lighter grades and impurities are carried upward by the current. The heaviest grain, thus falling from the hopper to the bottom of the tube, may be denominated the "first quality;" the lighter grades and dirt, ascending as described, will, through the direction of the current, be caused to strike the partition $I^1$, which will precipitate them on to the inclined screen or apron $H^1$, conducted down which, they will again be separated by the same current, the very light portions being carried up through the tube $F^1$ and by means of the dipping bonnet $e^1$ deposited in the light grain receiver $G^1$ while the dirt will be drawn through the fan, and (if desired to further cleanse and separate) the heavier grain, striking the bonnet $e^1$ and falling back down the tube $F^1$ may be repeatedly operated upon in like manner to that described by conducting it, or the remaining products, to any number or series of sets of tubes similar to $B^1$ and $F^1$ with their accompanying parts, one further set of tubes however, for general separating purposes, being deemed amply sufficient, they consisting of the duplicate tubes and parts already particularized in this specification by Fig. 2 attached to their several distinguishing letters, and to which tubes the grain at the bottom of the tube $F^1$ is led by passing through the spring valve $i^1$ (that permits the discharge of the grain but excludes the admission of air) it proceeds down the spout K to the hopper L, entering the smaller tube $B^2$, in which a further upward current of air, of suitable strength as regulated by the appropriate valves, causes the lighter kernels and remaining dirt to be subjected to a repetition of the separating process already described, the duplicate tubes $B^2$ and $F^2$ with their accompanying parts accomplishing the same, while the heavier kernels may be delivered at the bottom of the tube $B^2$ as a further grade of grain, or through hinged valve M and spout N conducted, if desired, to the hopper A for re-operation to further cleanse the same. The valve $i^2$ may serve to supply a third set of tubes if the separating process is required to be extended, or, as in the present instance, it may be used to reconvey the lighter grade of grain for a repetition of the cleansing process, back to the tube $B^2$. The light grain in the receivers $G^1$ $G^2$ may be drawn off, by their respective slides, as further grades in quality. The screens $H^1$ $H^2$ do not, it will be observed, perform the office of screens, they constituting aprons, and conduct the grain to the tubes $F^1$ $F^2$ to which tubes they also serve the important function of admitting air to the bottom.

Now, I am well aware that suction has been similarly employed for the purposes of cleansing and separating grain, as, for example, in Sanders' patented machine, where the lighter grain and impurities are conducted upward by the current through a vertical tube, the dirt passing off by the direct draught through the fan while the grain is precipitated within a suitable receiver, but such machine is very limited and imperfect in its operation, much of the good, though light, grain being drawn off and wasted by the draft of the fan, if it—the draft—be of sufficient strength to thoroughly cleanse from all dirt and impurities, while the separating process into different grades is necessarily confined. The advantages possessed by my improvements are from the foregoing description self evident—a strong and sufficient current, to thoroughly cleanse the grain without incurring any loss or waste, may be employed; and any number of grades, ranging according to their several specific gravities, procured by the separating and re-cleansing process described; this latter advantage is of importance in particular districts to meet the requirements of certain markets.

I do not claim the mere separation of grain into several grades according to specific gravity by the action of the suction fan, and the arrangement of a single set of tubes $B^1 F^1$ or $B^2 F^2$ as such is well known. But What I do claim as new and of my own invention, is—

Arranging and connecting a series of two or more sets of separating passages $B^1 F^1$; $B^2 F^2$, substantially as herein set forth, so that the grain may be carried through the entire series of separating passages as often as required by the operator, for thoroughly cleaning and separating the same as hereinbefore specified.

In testimony whereof I have hereunto signed my name before two subscribing witnesses.

JOSEPH BONE.

Witnesses:
 ANDREW GAUDY,
 WILLIAM COPELAND.